(12) United States Patent
Ogihara et al.

(10) Patent No.: US 6,863,922 B2
(45) Date of Patent: Mar. 8, 2005

(54) METALLIC SLIDING MEMBER, PISTON FOR INTERNAL COMBUSTION ENGINE, METHOD OF SURFACE TREATING THESE, AND APPARATUS THEREFOR

(75) Inventors: Hidemi Ogihara, Wako (JP); Masato Ishiwata, Tokyo (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/169,063

(22) PCT Filed: Nov. 16, 2001

(86) PCT No.: PCT/JP01/10053

§ 371 (c)(1),
(2), (4) Date: Jul. 2, 2002

(87) PCT Pub. No.: WO02/40743

PCT Pub. Date: May 23, 2002

(65) Prior Publication Data

US 2003/0000383 A1 Jan. 2, 2003

(30) Foreign Application Priority Data

Nov. 16, 2000 (JP) ........................................ 2000-350123

(51) Int. Cl.$^7$ ................................................ B05D 1/02
(52) U.S. Cl. ........................................ 427/190; 427/427
(58) Field of Search ................................ 427/190, 427, 427/475, 180, 189; 48/557

(56) References Cited

U.S. PATENT DOCUMENTS

| | | | | |
|---|---|---|---|---|
| 3,574,658 A | * | 4/1971 | Fulk et al. | ................... 428/209 |
| 4,753,094 A | * | 6/1988 | Spears et al. | |
| 5,592,840 A | * | 1/1997 | Miyasaka | ...................... 72/53 |

FOREIGN PATENT DOCUMENTS

| | | | |
|---|---|---|---|
| JP | 11-131257 A | | 5/1999 |
| JP | 11-131257 | * | 5/1999 |

OTHER PUBLICATIONS

Gimore et al, Journal of Thermal Spraying, vol. 8 #4, pp. 576–582. Dec. 1999.*

* cited by examiner

*Primary Examiner*—Fred J. Parker
(74) *Attorney, Agent, or Firm*—Arent Fox, PLLC

(57) ABSTRACT

A metallic sliding member which is improved in initial compatibility and significantly reduced in frictional resistance: and a process for producing the member. The process comprises causing fine particles of molybdenum disulfide to collide against the surface of a base to form a layer containing molybdenum disulfide, serving as a solid lubricant, as a surface layer having a depth not larger than 20 μm from the surface.

8 Claims, 10 Drawing Sheets

METALLIC SLIDING MEMBER, PISTON FOR INTERNAL COMBUSTION ENGINE, METHOD OF SURFACE TREATING THESE, AND APPARATUS THEREFOR

FIELD OF THE INVENTION

The present invention relates to pistons for internal combustion engines and other metallic sliding members having reduced sliding resistance by forming solid lubricant layers on sliding surfaces and relates to surface treatment methods therefor, and more particularly, the present invention relates to a technique for improving the initial fitting and substantially reducing the frictional resistance by forming a solid lubricant layer from the surface to the inside of sliding surfaces.

BACKGROUND ART

As a technique for reducing the sliding resistance of sliding members, hitherto, it has been known to coat the sliding surface of a sliding member with a solid lubricant such as molybdenum disulfide, tetrafluoroethylene resin, or tin oxide. Such solid lubricants are not only low in frictional resistance but are also relatively soft, and hence are easily worn in an initial phase of operation, and the so-called initial fitting is terminated at an early stage, and the sliding resistance and wear amount are stabilized at a low level. As the coating methods for solid lubricants, a method for dispersing and applying a solid lubricant on a binder resin, and a coating method by plating are known. Japanese Patent Application Laid-open No. 11-193455 discloses a technique of forming a molybdenum sulfide film on the sliding surface of a sliding member by sputtering.

However, in the method for applying a solid lubricant on the binder resin, the function of the solid lubricant is not exhibited sufficiently due to the presence of the binder portion (for example, about 50%). In addition, common problems in the prior art include changes in dimensions of sliding members by formation of solid lubricant film, difficulty in control of thickness of solid lubricant film, risk of peeling of solid lubricant film, and shortness of service life. In particular, the method for forming a solid lubricant film by sputtering is higher in equipment cost and manufacturing expenses, and it is difficult to treat curved surfaces.

Pistons for internal combustion engines (hereinafter called pistons) are designed to maintain their position by receiving a part of an explosion pressure in a combustion chamber by a piston ring sliding on a sleeve, and bringing a skirt portion provided at the lower side of the piston ring into contact with the sleeve. Therefore, if the skirt portion and sleeve do not contact with each other favorably, the sliding resistance increases and the fuel economy is sacrificed, or possibly due to abnormal contact between the piston and the sleeve, galling, seizure, or unusual sounds may occur.

Japanese Utility Model Application Laid-open No. 52-16451 and Japanese Utility Model Application Laid-open No. 57-193941 propose methods for forming fine dimples by sand blasting or shot peening in the skirt of the piston, but such methods are known not to be effective for preventing occurrence of unusual sounds.

DISCLOSURE OF THE INVENTION

It is therefore an object of the invention to solve the various problems by forming a solid lubricant layer, and provides a metallic sliding member capable of enhancing the initial fitting and substantially reducing the frictional resistance, and a method for manufacturing the same. It is a further object of the invention, by employing of such metallic sliding members, to provide a piston capable of narrowing the clearance between the skirt of the piston and the sleeve, stabilizing the position of the piston, preventing occurrence of piston hammering sounds, and suppressing noise and vibration, and to provide a method for manufacturing the same.

The metallic sliding member of the invention is characterized by forming a layer containing molybdenum disulfide as a solid lubricant (hereinafter called a solid lubricant layer) with a depth of 20 $\mu$m from the surface thereof by collision of fine powder of molybdenum disulfide on the surface thereof.

The metallic sliding member of this composition does not require binder resin at all, and the molybdenum disulfide is directly driven into the matrix by driving, for example, by employing a shot peening technique, and therefore the essential characteristic of molybdenum disulfide for enhancing the sliding resistance decreasing effect, that is, the initial fitting improving effect, is exhibited, as well as the frictional resistance is substantially decreased. Moreover, by driving on the basis of the shot peening technique, since the solid lubricant is driven into the metallic sliding member while partly diffusing thermally, it is free from problems such as dimensional changes due to formation of solid lubricant film and complicated dimensional control, and the solid lubricant layer thus formed is very firm and resistant to peeling and wear, and the sliding resistance decreasing effect is maintained for a long period. Also, due to the shot peening technique, metallic sliding members having curved surfaces can be treated without any difficulty.

Furthermore, in the surface treatment method for metallic sliding members of the invention, only compressed air and molybdenum disulfide are used, and discharged substances during use are only fragments of molybdenum disulfide of reduced size and air. Accordingly, by classifing the fragments of molybdenum disulfide, molybdenum disulfide powders of uniform particle size and free from foreign matter, are obtained, and these can be recycled for other purposes.

Such metallic sliding members can be manufactured by the surface treatment of collision of fine powder of molybdenum disulfide against the surface at a speed of 100 m/sec or more together with compressed air at 0.5 MPa or more (gauge pressure). Other features of the invention include such surface treatment method and surface treatment apparatus. By surface treatment under such conditions, fine powder of molybdenum disulfide is driven into the surface, and a solid lubricant layer is formed. That is, by the collision energy of molybdenum disulfide against the surface, the surface layer portion of the matrix of, for example, aluminum, is melted by a momentary temperature rise, and particles of molybdenum disulfide are embedded or fixed to the surface. Also, by recrystallization of the molten surface layer portion, crystal grains become smaller, and the surface layer is hardened by the forging effect of shot peening, and thereby the hardness of the surface layer portion is raised. Moreover, unlike the sputtering method, such surface treatment method does not require expensive equipment and is low in manufacturing cost, and it is easy to treat curved surfaces.

By heat generation of the matrix due to collision of molybdenum disulfide against the surface, an intermetallic compound of molybdenum disulfide may be formed, for example, on the aluminum alloy matrix surface. It is believed that an intermetallic compound is present in the crystal grain boundary of driven particles of molybdenum disulfide and the matrix and the fixing strength of the two is thereby enhanced.

BRIEF DESCRIPTION OF THE DRAWINGS

FIG. 1B is a diagram showing a state after running-in.

FIG. 2B is a diagram showing a state after running-in.

FIG. 3B is a diagram showing a state after running-in.

FIG. 4B is a diagram showing a state after running-in.

FIG. 6 is a sectional view showing a convex portion of a piston before initial wear.

BEST MODE FOR CARRYING OUT THE INVENTION

A preferred embodiment of the invention is described below.

Preferably, fine dimples are formed on the surface of a solid lubricant layer. Dimples can be formed by driving particles of molybdenum disulfide into the surface of a metallic sliding member. The action of dimples is explained by referring to an example of a piston shown in FIG. 1A and others.

Figure 1A:
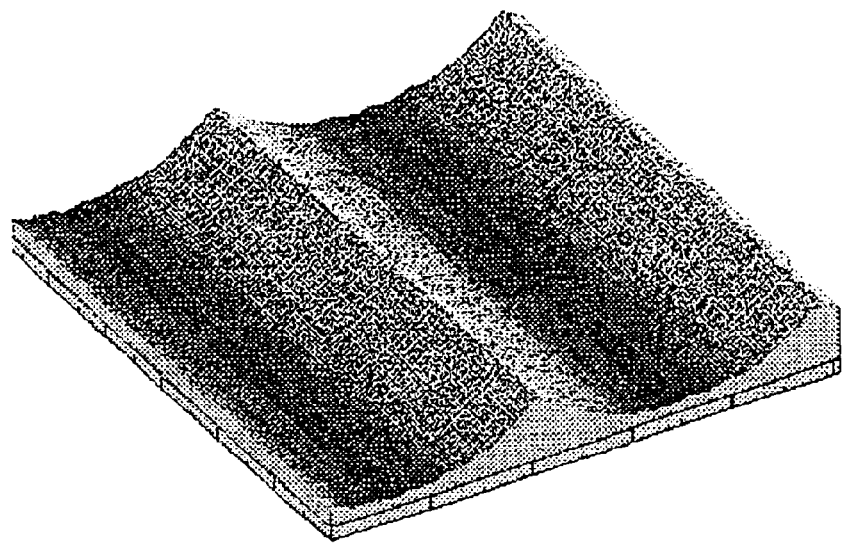
FIG. 1A is a magnified perspective view of the surface of a piston having no dimples, showing a state before initial wear.

FIG. 1A is a computer graphic depiction of the surface of a skirt portion of a piston having no dimples, showing a convex portion extending in the circumferential direction of the piston main body. FIG. 1A also shows a state before machining of an outer circumference of the piston main body, and convex portions are formed between arc-shaped concave portions. The piston main body can be machined by moving relatively in the axial direction while cutting the outer circumference of the piston by using a cutting tool. In this case, convex portions are formed spirally in the axial direction.

Figure 1B:
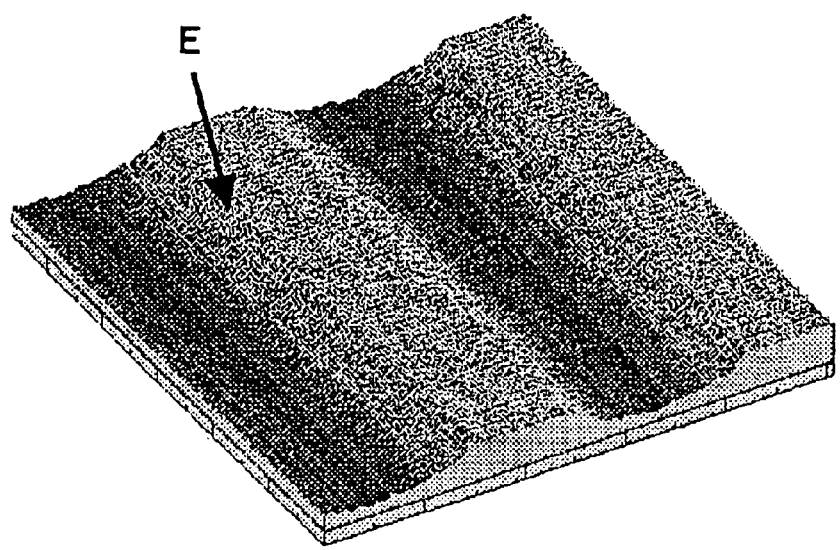
Figure 2A:
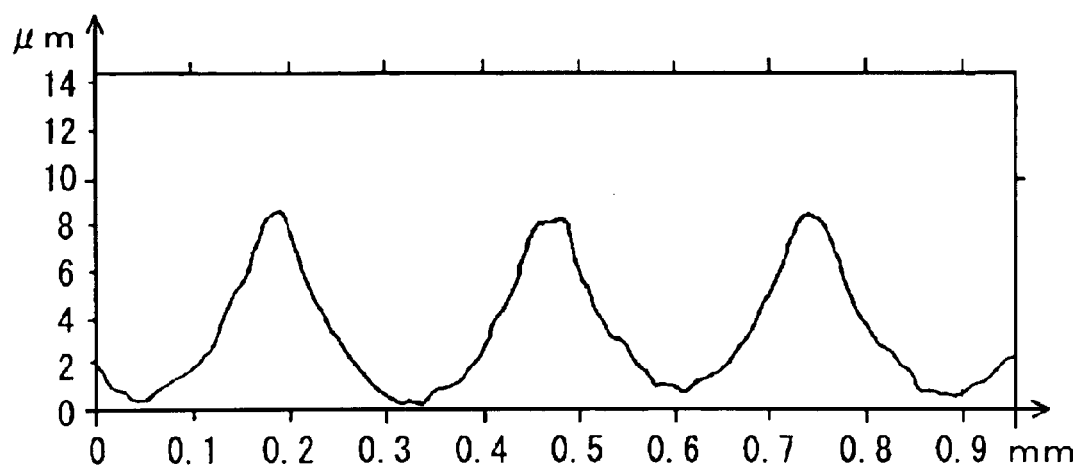
FIG. 2A is a sectional view of the surface of a piston having no dimples, showing a state before initial wear.
Figure 2B:
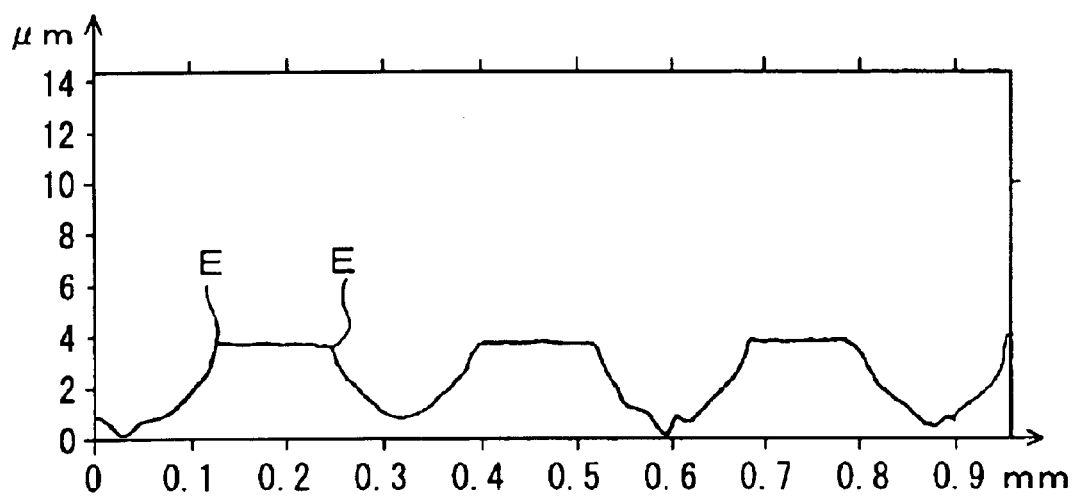

When initial wear occurs in the piston, the tip of the convex portion is worn to become trapezoidal as shown in FIG. 1B. As a result, an edge E is formed in the margin of the sliding surface of the trapezoidal portion, and the lubricating oil collected in the concave portion is hindered by the edge E, and is not supplied into the sliding surface which requires lubrication. FIGS. 2A and 2B are sectional views showing the convex portion shown in FIGS. 1A and 1B, and more specifically FIG. 2A shows a state after machining and FIG. 2B shows a state after running-in. As is understood from FIG. 2B, the edge formed in the margin of the sliding surface after running-in kicks back, and the lubricating oil is not supplied in some parts of the sliding surface, and the temperature rises in such parts, which may cause galling, seizure or unusual sounds.

Figure 3A:
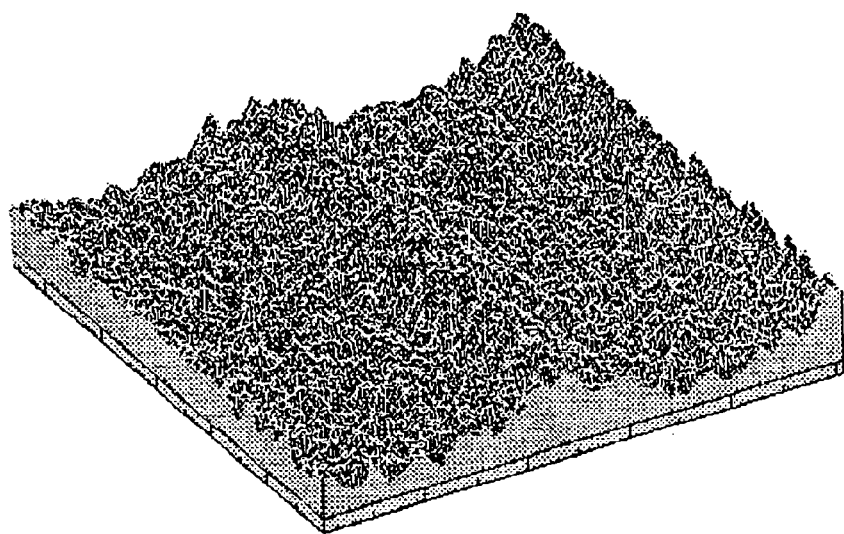
FIG. 3A is a magnified perspective view of the surface of a piston, showing a state before initial wear.
Figure 3B:
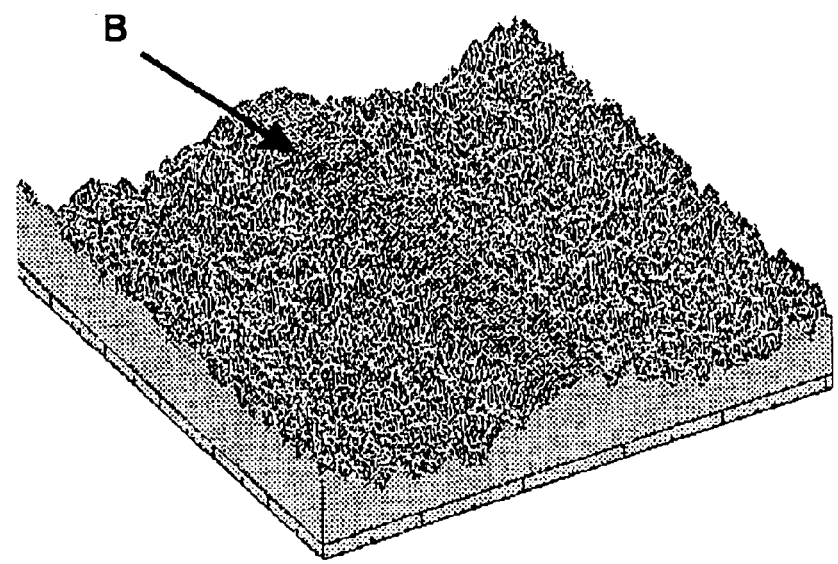

FIG. 3A is a schematic computer graphic depiction of the surface of the skirt portion of the piston having dimples, showing the convex portion extending in the circumferential direction of the piston main body, and fine dimples formed on the convex surface. When initial wear occurs in this piston, the tip of the convex portion is worn and becomes trapezoidal as shown in FIG. 3B. In the margin of the sliding surface of this trapezoidal portion, a bay B is formed by dimples.

Figure 5A:
FIG. 5A is a schematic sectional view of the surface of a conventional piston.
Figure 5B:
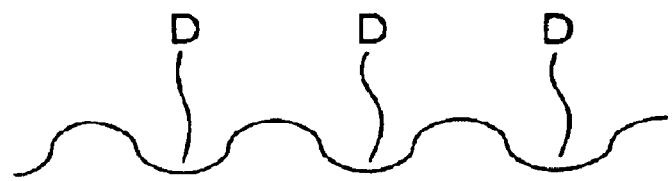
FIG. 5B is a schematic sectional view of a piston in an embodiment of the invention.
Figure 5C:
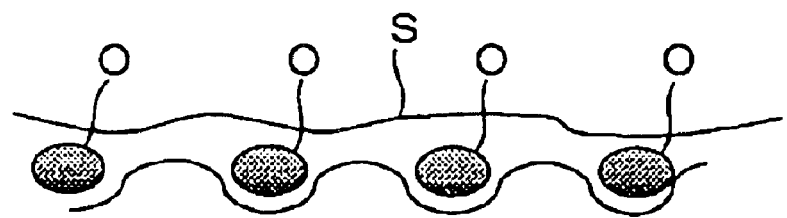
FIG. 5C is a diagram showing a state of holding of oil droplets in dimples.

The function of dimples is explained by referring to FIGS. 5A and 5B. The machined surface of the piston main body has V-grooves extending in the circumferential direction, microscopically, as shown in FIG. 5A. When the lubricating oil is supplied on this surface and a surface pressure is applied, the lubricating oil tends to gather in the groove bottoms, rather than at the sharp tips, by capillary action, and an oil film is hardly formed, and the sliding resistance is large. On the other hand, FIG. 5B shows dimples. When the lubricating oil is supplied on this surface, dimples D serve as an oil reservoir to hold oil droplets O, as shown in FIG. 5C, and if a surface pressure is applied, an oil film S is held, and an increase in sliding resistance is prevented.

Figure 4A:
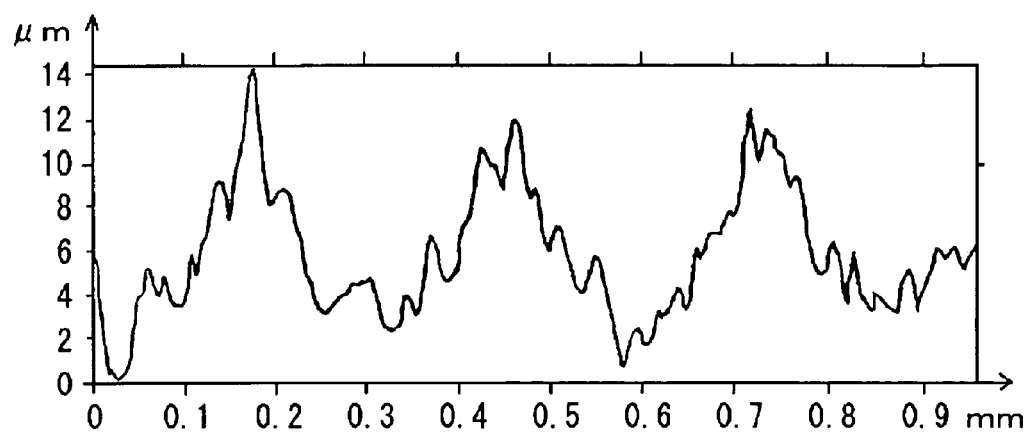
FIG. 4A is a sectional view of the surface of a piston, showing a state before initial wear.
Figure 4B:
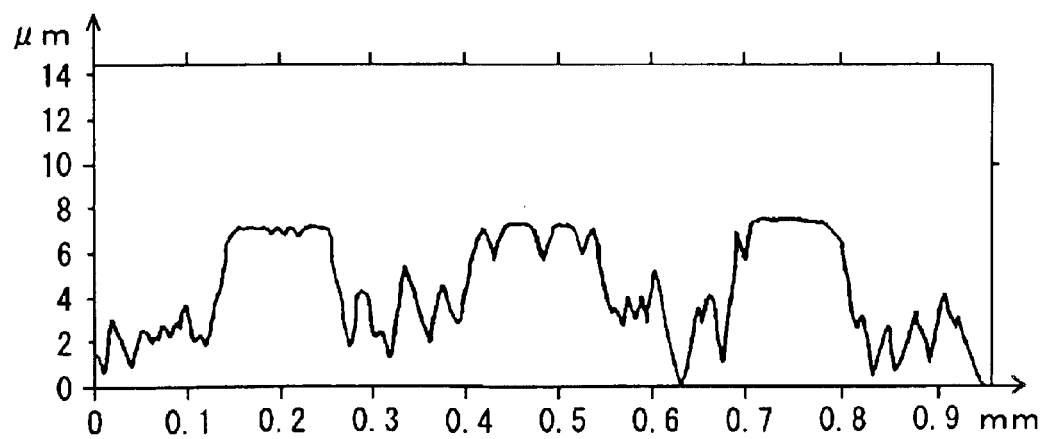

By having such dimples, the lubricating oil is held in fine dimples, and the lubricating oil is easily supplied into the sliding surface from the bay B by the vertical motions of the piston. Therefore, after the initial fitting, when the piston is fitted to the sleeve, the lubricating oil is supplied into the sliding surface, and an oil film is formed, and the sliding surface is effectively lubricated, and the sliding resistance is decreased and generation of unusual sounds is prevented. FIGS. 4A and 4B show the sectional shape of the convex portion shown in FIGS. 3A and 3B, and specifically, FIG. 4A shows a state before initial wear, and FIG. 4B shows a state after running-in. As shown in FIG. 4A, fine corrugations (dimples) are formed by shot peening in the convex portion, and a layer containing a solid lubricant of molybdenum disulfide is also formed. By the oil holding improving effect on the surface by dimples and the solid lubrication effect by the molybdenum disulfide, the initial wear of the initial fitting is terminated in a short time. That is, the balance of various factors such as the amount of lubricating oil supplied on the sliding surface and magnitude of the surface pressure generated on the sliding surface is achieved in an extremely short time by the layer containing molybdenum disulfide formed on the surface, and the sliding resistance is decreased substantially in the initial fitting. As shown in FIG. 4B, after running-in, dimples holding the lubricating oil remain, and the oil holding improving effect on the surface is maintained, and also a layer containing molybdenum disulfide remains in dimples. Accordingly, the sliding resistance value lowered in the initial fitting in a short time is maintained in the subsequent operation. By shot peening, unlike plating or coating, there is no dimensional change of the matrix, and the clearance between the skirt portion of the piston and the skirt is reduced while maintaining the sliding resistance low by these actions, and therefore the piston position is stabilized, piston hammering sounds are suppressed, and noise and vibration can be reduced.

Such fitting phenomenon should preferably be completed earlier and at a smaller wear amount. The tip of the convex portion provided along the circumferential direction of the skirt portion on the sliding surface with the sleeve slides and is worn until the surface pressure is stabilized. This is because an extra tip portion of the convex portion is removed in order to maintain a corresponding surface area for withstanding the surface pressure of sliding. The removed tip portions are collected in the lubricating oil as worn particles. To minimize the worn powder, it is effective to maintain a flat plane for withstanding the surface pressure preliminarily, instead of forming sharp edges from the beginning. Therefore, the convex portion is preferred to be trapezoidal in sectional view along the sliding direction. In this configuration, as compared with the case of forming sharp edges by machining, the surface pressure applied on the sliding surface, the surface roughness, and the amount of lubricating oil supplied depending on the relative sliding speed are stabilized earlier.

Dimples must have a proper size for obtaining these effects. If the dimples are too small, the ability to hold the lubricating oil is insufficient, and the size of the bay is too small, and the action of pulling out the lubricating oil to the sliding surface is insufficient. On the other hand, if the dimples are too large, deformation of the convex shape is significant, and the effect of forming the convex portion is sacrificed, and the surface roughness is excessive, which may lead to an increase in the sliding resistance. Dimples can be formed by shot peening. In this case, since the size of the dimples is limited as explained above, the average depth of dimples is preferred to be 0.5 to 6.0 $\mu$m. The average depth of dimples is calculated by measuring the values of surface roughness Ra.

Figure 6A:
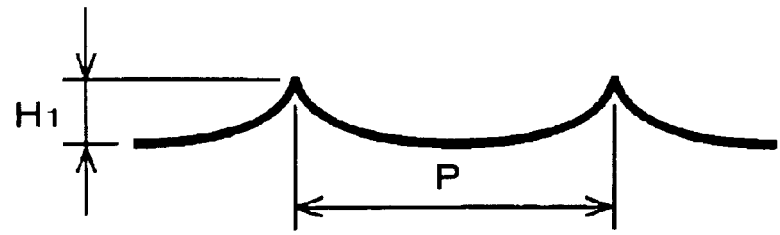
FIG. 6A shows an arc-shaped section of concave portion.
Figure 6B:
FIG. 6B shows an arc-shaped section of a convex portion opposite to FIG. 6A.
Figure 6C:
FIG. 6C shows continuous corrugations of a concave portion and convex portion in a sectional view.
Figure 6D:
FIG. 6D shows a trapezoidal section of a concave portion and convex portion.
Figure 6E:
FIG. 6E shows a triangular section of a convex portion and concave portion.

FIGS. 6A and 6B show the sectional shape of the convex portion before initial wear. FIG. 6A shows an arc-shaped section of the concave portion, but is not limited to this shape, and contrary to FIG. 6A, the convex portion may have an arc-shaped section (FIG. 6B), or concave portions and convex portions may be continuous to form corrugations in a sectional view (FIG. 6C). Alternatively, the section of the concave portion and convex portion may be trapezoidal (FIG. 6D) or triangular (FIG. 6E). In order to reliably obtain the action and effect of the invention, the interval P of the convex portions is preferred to be 200 to 400 $\mu$m, and more preferably 250 to 300 $\mu$m. The height $H_1$ from the bottom of the concave portion to the tip of the convex portion before initial wear is preferred to be 7 to 15 $\mu$m, or more preferably 8 to 12 $\mu$m.

The average size of fine powder of molybdenum disulfide colliding against the surface of the metallic sliding member is preferred to be 2 to 200 $\mu$m, and more preferably 4 to 10 $\mu$m. Dimples may be provided only on the convex portion surface, but are preferred to be provided on all surfaces including concave portions. By providing the above convex portions and dimples in the grooves and lands of the piston ring, as well as in the skirt portion of the piston, abnormal wear between the grooves and the piston ring, or the lands and the sleeve can be prevented.

The metallic sliding member of the invention is not limited to such a piston as described above, but may be applied to any other members sliding with respect to each other. For example, it may be applied to reciprocating sliding parts or rotating sliding parts, such as a piston pin, sliding bearing for internal-combustion engine, cam shaft holder, etc. The invention may be applied also to parts abutting against or contacting with opposite parts, but not sliding with each other. For example, the invention can also be applied to piston side surface, cam journal, cam end surface, crank journal surface, rocker arm slipper surface, oil pump rotor, oil pump rotor's case, or the like. By composing at least one of these opposite members as described above, the same effects as mentioned above can be obtained, such as decrease of frictional resistance on the contact surface, improvement of initial fitting, retention of lubricating oil, and prevention of the occurrence of unusual sounds.

Figure 11:
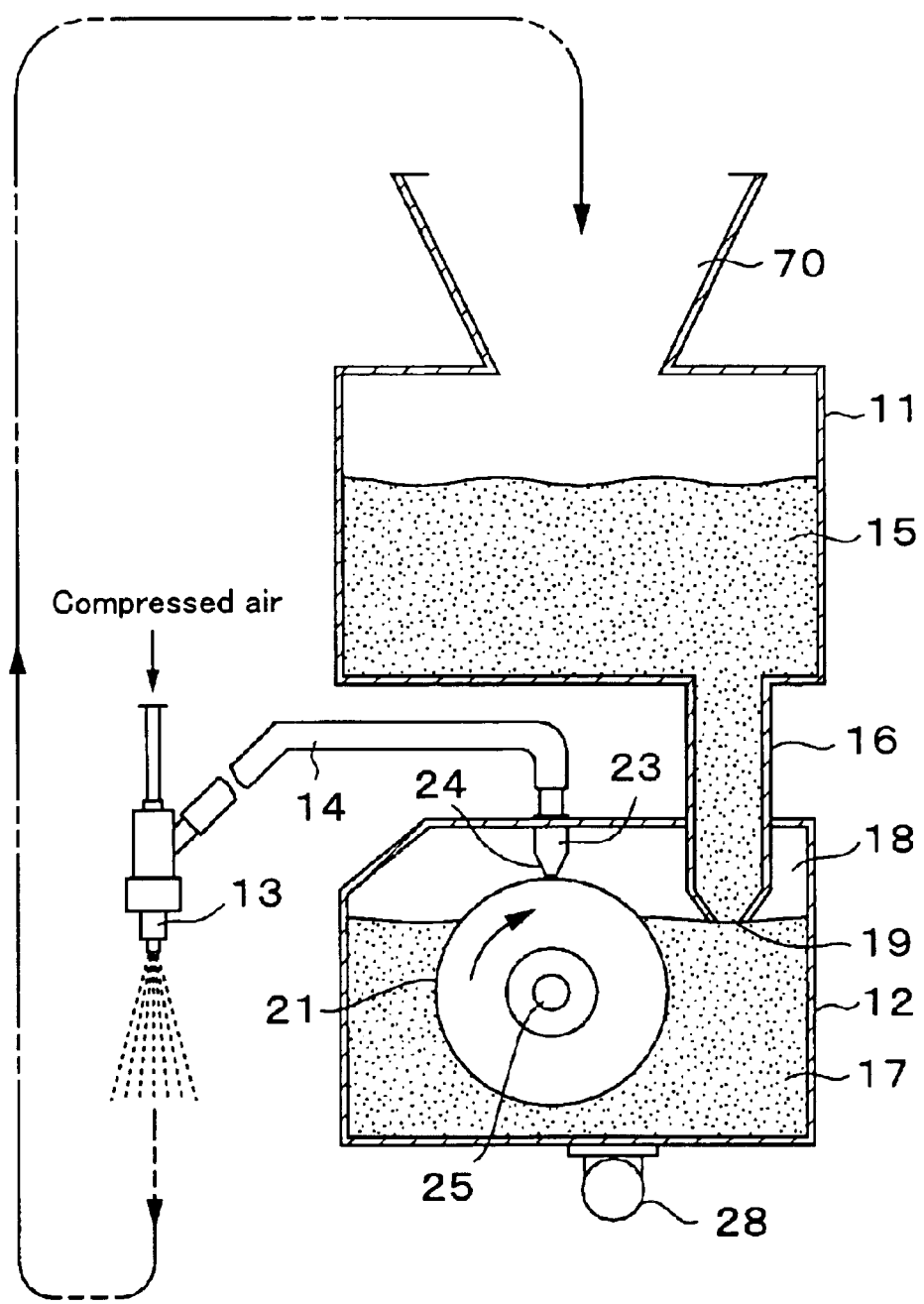
FIG. 11 is a side sectional view of a surface treatment apparatus in an embodiment of the invention.

FIG. 11 is a side sectional view showing a preferred embodiment of a surface treatment apparatus of the invention.

In FIG. 11, reference numeral 11 is a powder tank, and reference numeral 12 is a powder amount adjusting tank. In the bottom of the powder tank 11, a feed pipe 16 is fixed, which extends downward to penetrate through the top wall of the powder amount adjusting tank 12. A feed port 19 of the feed pipe 16 is provided at a position of about ⅔ of the height from the bottom of the powder amount adjusting tank 12.

Inside of the powder amount adjusting tank 12, a capturing rotary plate 21 is rotatably supported by a shaft 25 installed in a horizontal direction. On the outer circumference of the capturing rotary plate 21, plural V-section grooves (not shown) are formed on the entire circumference. A suction pipe 23 is positioned in the center of the peak of the capturing rotary plate 21. At the lower end of the suction pipe 23, a suction port 24 is provided with its lower edge kept in contact with the outer circumference of the capturing rotary plate 21. The upper end of the suction pipe 23 protrudes by penetrating through the top wall of the powder amount adjusting tank 12, and an injection nozzle 13 is linked to its end through a powder feed pipe 14. Compressed air is supplied to the rear end of the injection nozzle 13. Reference numeral 70 in the diagram shows a recovery tank such as cyclone, and reference numeral 28 is a vibrator for keeping constant the amount of powder captured in the grooves on the outer circumference of the capturing rotary plate 21.

The operation of the surface treatment apparatus having such a configuration is explained below. When fine powder 15 of molybdenum disulfide is supplied into the powder tank 11, the powder 15 falls into the powder amount adjusting tank 12 through the feed pipe 16. In the powder amount adjusting tank 12, a powder layer 17, and an air layer 18 at its upper side are formed. When the height of the powder layer 17 reaches the feed port 19, the powder 15 no longer falls down from the feed pipe 16. Therefore, when the powder in the powder amount adjusting tank 12 is consumed, the powder falls down from the feed pipe 16 by the corresponding portion, so that the height of the powder layer 17 is always kept constant.

The capturing rotary plate 21 rotates in the direction of the arrow, and the powder is captured in the grooves on the outer circumference. On the other hand, when the compressed air is supplied into the injection nozzle 13, the inside of the suction portion 24 is evacuated to have a negative pressure. Accordingly, when the powder reaches the suction port 24, it is sucked into the suction pipe 23 by the negative pressure, and is injected from the injection nozzle 13 through the powder feed pipe 14. At this time, the pressure of the compressed air is 0.5 MPa (gauge pressure), and the powder of molybdenum disulfide injected from the injection nozzle 13 collides against the metallic sliding member, such as a piston, together with the compressed air, at a speed of 100 m/sec or more. As a result, a layer containing molybdenum disulfide as solid lubricant is formed within a depth of 20 $\mu$m from the surface of the metallic sliding member.

After this process, the molybdenum disulfide powder is a mixture of ground powder and non-ground powder, but since no foreign matter is mixed therein in the invention, this powder is recoverable, and non-ground powder or ground powder having a specified particle size may be classified by a special classifier, and be supplied into the powder tank 11 from the powder feed portion 70 for recycling as indicated by double dot chain line in FIG. 11. On the other hand, the ground molybdenum dioxide powder having a small particle size is classified by the classifier, and may be used for other purposes. Therefore, according to the invention, the consumption of molybdenum disulfide powder can be substantially reduced, and hence the product cost can be lowered.

EXAMPLES

The invention is more specifically described below while referring to a specific example.

A. Preparation of Sample

Figure 7:
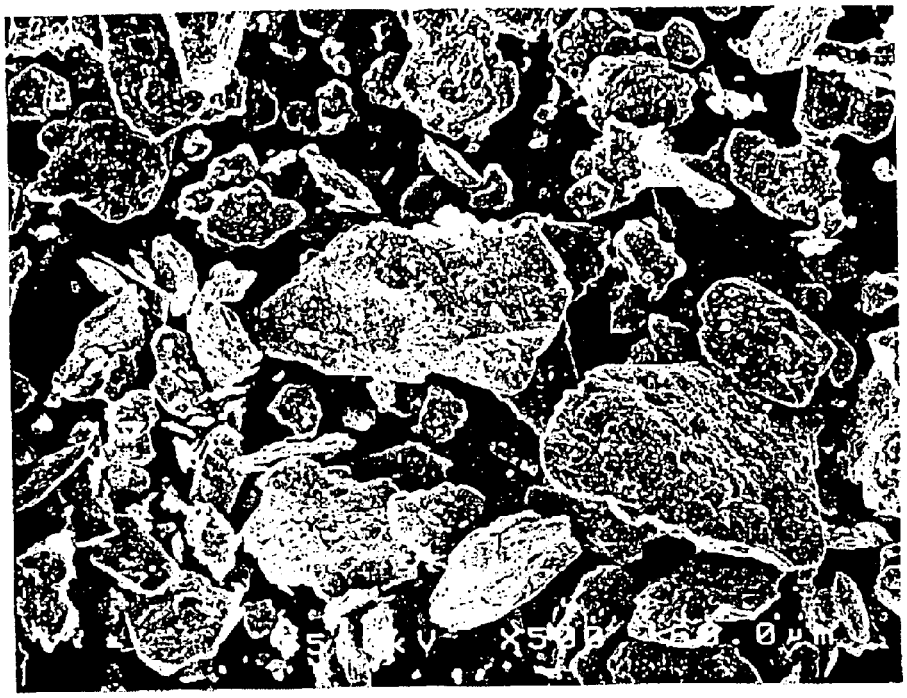
FIG. 7 is an electron microscope photograph of a fine powder of molybdenum disulfide.

A piston of typical shape and size was fabricated. On the outer circumference of the piston, trapezoidal convex portions (stripes) as shown in FIG. 6D were formed, at the interval of convex portions of about 250 $\mu$m and height of convex portions of about 10 $\mu$m. Scaly fine powder of molybdenum disulfide of average size of 4 $\mu$m and purity of 98.6% by weight was blasted at the side surface of the piston at a distance of 50 mm by compressed air at a pressure of 8 atmospheres. The blasting duration to the piston was 8 minutes. FIG. 7 is an electron microscope photograph (500 times) of the molybdenum disulfide used herein.

B. Measurement of Friction Loss

Figure 10:
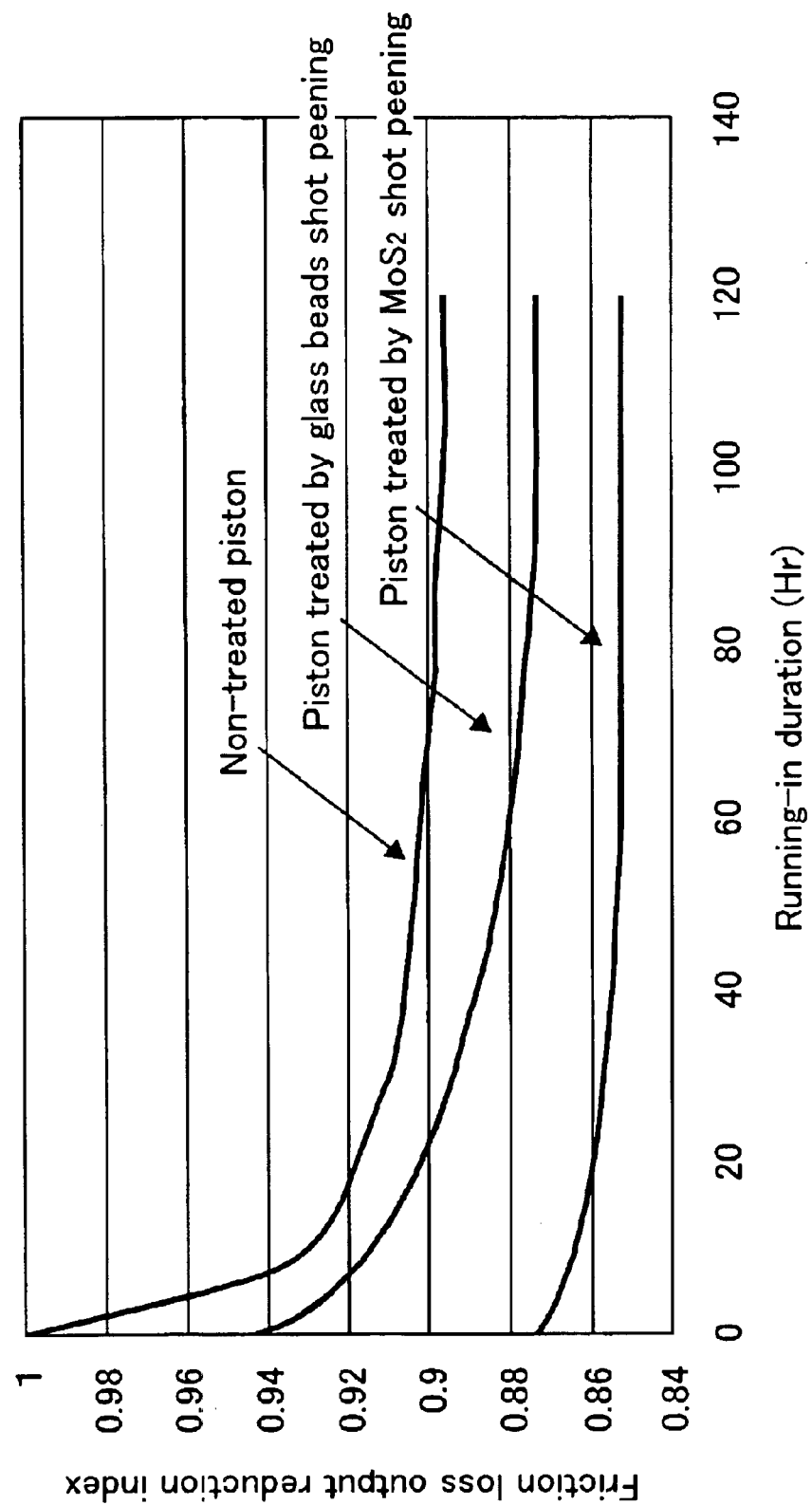
FIG. 10 is a diagram showing the relationship between running-in duration and friction loss output reduction index in an embodiment.

The sample was installed in an internal combustion engine, and the friction loss was measured by running-in. In this measurement of friction loss, the friction loss horsepower of the internal combustion engine was measured, and the reduction index of friction loss output was calculated from the change in the horsepower. FIG. 10 shows time-course changes of the reduction index of friction loss output, assuming the reduction index of friction loss output upon start of running-in to be 1. In FIG. 10, the reduction index of friction loss output of 0.86 means that the sliding resistance is decreased by 14%. By way of comparison, the same piston material as in the example of the invention having the side surface treated by shot peening using glass beads, and a piston material without any treatment, were measured by similar running-in. Results are also shown in FIG. 10 as comparative examples.

As shown in FIG. 10, in the example of the invention, the reduction index of friction loss output upon start of running-in was about 0.87, and was stable at about 0.85 in 60 hours. In contrast, in the comparative example treated by shot peening using glass beads, it took 80 hours until the reduction index of friction loss output was stabilized, and the value was about 0.87. In the comparative example of the piston material without any treatment, it took 100 hours until the reduction index of friction loss output was stabilized, and the value was about 0.9. Thus, in the example of the invention, the running-in ended in a shorter time, and the reduction index of friction loss output was substantially improved. In the sliding parts of the stripes of the skirt portion after 100 hours of running-in (equivalent to a running distance of 16,000 km), molybdenum disulfide remained in 40 to 50% by area.

C. Observation of Solid Lubricant Layer

Figure 8:
FIG. 8 is an electron microscope photograph of a siding surface after running-in of a piston in which a fine powder of molybdenum disulfide is driven.
Figure 9:
FIG. 9 is an electron microscope photograph of a siding section after running-in of a piston in which a fine powder of molybdenum disulfide is driven.

FIG. 8 shows an electron microscope photograph (100 times) of the side surface of the piston of the invention having molybdenum dioxide after running-in. As is clear from FIG. 8, molybdenum disulfide is driven in the entire side surface of the piston, and fine dimples remain. The surface roughness Ra of the piston side surface was measured, and the average Ra value was obtained as the average depth. As a result of measurement, the average depth of dimples was 1.8 $\mu$m. The driving depth of molybdenum disulfide (the dimension from the surface to the deepest end of molybdenum disulfide) was estimated to be about 6 $\mu$m. FIG. 9 is an electron microscope photograph (2000 times) of the side section of the same piston. As shown in FIG. 9, the driven molybdenum disulfide (dark area) is present near the piston surface. Gray and black spots beneath the molybdenum disulfide are recrystallized aluminum alloy portions. As a result of composition analysis, traces of intermetallic compounds such as $\beta'$-$Mo_2C$ and $Al_8Mo_3$ were found in the boundary of the molybdenum disulfide and aluminum alloy portions. These intermetallic compounds are expected to increase the binding force between the molybdenum disulfide and aluminum alloy portions.

What is claimed is:

1. A surface treatment method for a metallic sliding member to be used in a lubricating environment containing lubricating oil, the method comprising:

colliding molybdenum disulfide particles entrained in compressed air of 0.5 MPa or more and at a speed of 100 m/sec or more; against a surface of the metallic sliding member for driving and embedding the molybdenum disulfide particles within a depth of 20 $\mu$m from the surface of the metallic sliding member form a layer of solid molybdenum disulfide; and, forming dimples comprising concave portions in the layer of the solid molybdenum disulfide, said dimples each having of a shape and size sufficient to hold the lubricating oil on the treated surface of the metallic sliding member.

2. A surface treatment method for a piston for an internal combustion engine of which sliding parts are treated by a surface treatment method for a metallic sliding member according to claim 1.

3. A surface treatment method for a piston for an internal combustion engine of which sliding parts are treated by a surface treatment method for a metallic sliding member according to claim 1.

4. The surface treatment method according to claim 1, wherein the dimples have an average depth of from 0.5 to 6.0 $\mu$m.

5. The surface treatment method according to claim 1, wherein the dimples are composed of concave portions and convex portions, and the convex portions are arranged at intervals of from 200 to 400 $\mu$m.

6. The surface treatment according to claim 1, wherein the dimples are composed of concave portions and convex portions, the concave portion and the convex portion have a height from a bottom of the concave portion to a tip of the convex portion before initial wear, and the height is from 7 to 15 $\mu$m.

7. The surface treatment method according to claim 1, wherein the fine powder of molybdenum disulfide has an average particle size of from 2 to 200 $\mu$m.

8. The surface treatment method according to claim 1, wherein the metallic sliding member is composed of aluminum or an alloy thereof.

* * * * *